United States Patent [19]

Anderson

[11] Patent Number: 4,715,173

[45] Date of Patent: Dec. 29, 1987

[54] ROTARY LAWN MOWER ACCESSORIES

[76] Inventor: James Anderson, 5445-4A Avenue, Tsawwassen, British Columbia, Canada, V4M 1H6

[21] Appl. No.: 741,111

[22] Filed: Jun. 4, 1985

[51] Int. Cl.$^4$ ............................................. A01D 55/00
[52] U.S. Cl. ........................................ 56/295; 56/229; 56/DIG. 9
[58] Field of Search .................... 56/229, 295, DIG. 9

[56] References Cited
U.S. PATENT DOCUMENTS

| | | |
|---|---|---|
| 2,527,472 | 10/1950 | Wolf . |
| 2,576,884 | 11/1951 | Leigh . |
| 2,786,322 | 3/1957 | McEvers . |
| 2,932,147 | 4/1960 | Beeston, Jr. . |
| 3,140,575 | 7/1964 | Ott et al. . |
| 3,184,903 | 5/1965 | Fjelstad .............................. 56/295 |
| 3,243,944 | 4/1966 | Michaud ............................ 56/295 |
| 3,538,692 | 11/1970 | Cope et al. ....................... 56/295 |
| 3,563,015 | 2/1971 | Renfroe ............................. 56/295 |
| 3,611,691 | 10/1971 | Howard ............................. 56/295 |
| 3,690,051 | 9/1972 | Wood ................................. 56/295 |
| 3,703,071 | 11/1972 | Anderson ......................... 56/295 |
| 3,762,138 | 10/1973 | Michael ............................. 56/295 |
| 3,835,630 | 9/1974 | Von der Au ...................... 56/295 |
| 3,949,541 | 4/1976 | Henry . |
| 4,351,144 | 9/1982 | Benenati ........................... 56/295 |
| 4,409,781 | 10/1983 | Blackstone ....................... 56/295 |
| 4,429,518 | 2/1984 | Fedeli ................................ 56/295 |
| 4,594,843 | 6/1986 | Andersson et al. ............. 56/295 |

Primary Examiner—C. Fred Rosenbaum
Assistant Examiner—Gene B. Kartchner
Attorney, Agent, or Firm—Carver & Co.

[57] ABSTRACT

The invention provides accessories for use with a rotary lawn mower in which the conventional bar having oppositely facing cutting edges is replaced with an accessory bar to which a variety of grass grooming accessories can be easily attached. The accessory bar can accommodate replaceable grass cutting elements, grass mulching elements and lawn power raking elements. The elements can be replaced without removing the accessory bar from the mower and are balanced to reduce vibration. Two of the accessories have cutting edges which are factory sharpened on relatively low cost elements, and thus can be discarded when blunt and replaced with new, low cost factory sharpened elements, thus maintaining balance. The rake accessory has a variation which permits a fine adjustment of vertical height of the rake above the lawn, to accommodate lawn mowers having coarse or no height adjustment.

8 Claims, 20 Drawing Figures

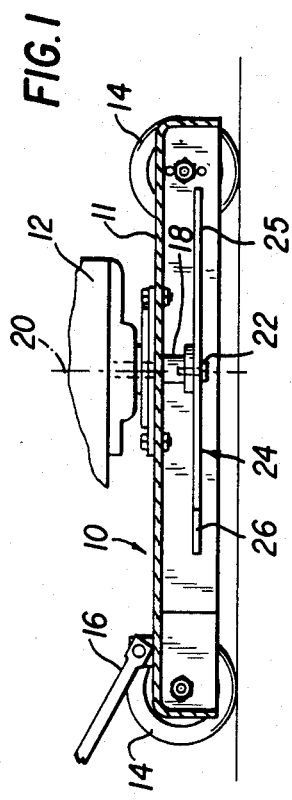
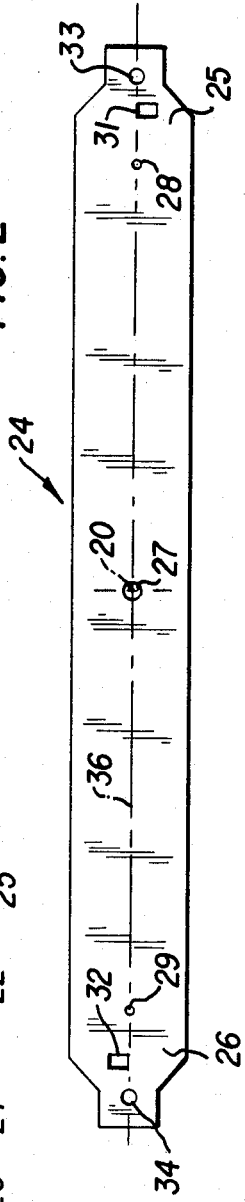
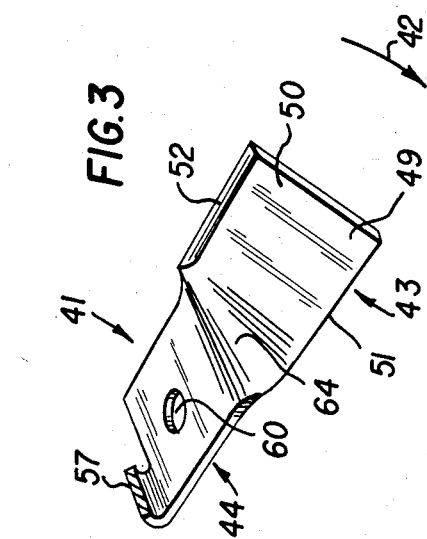
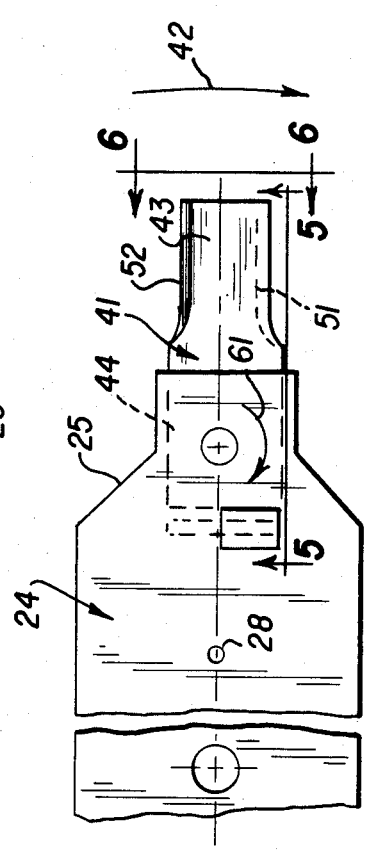

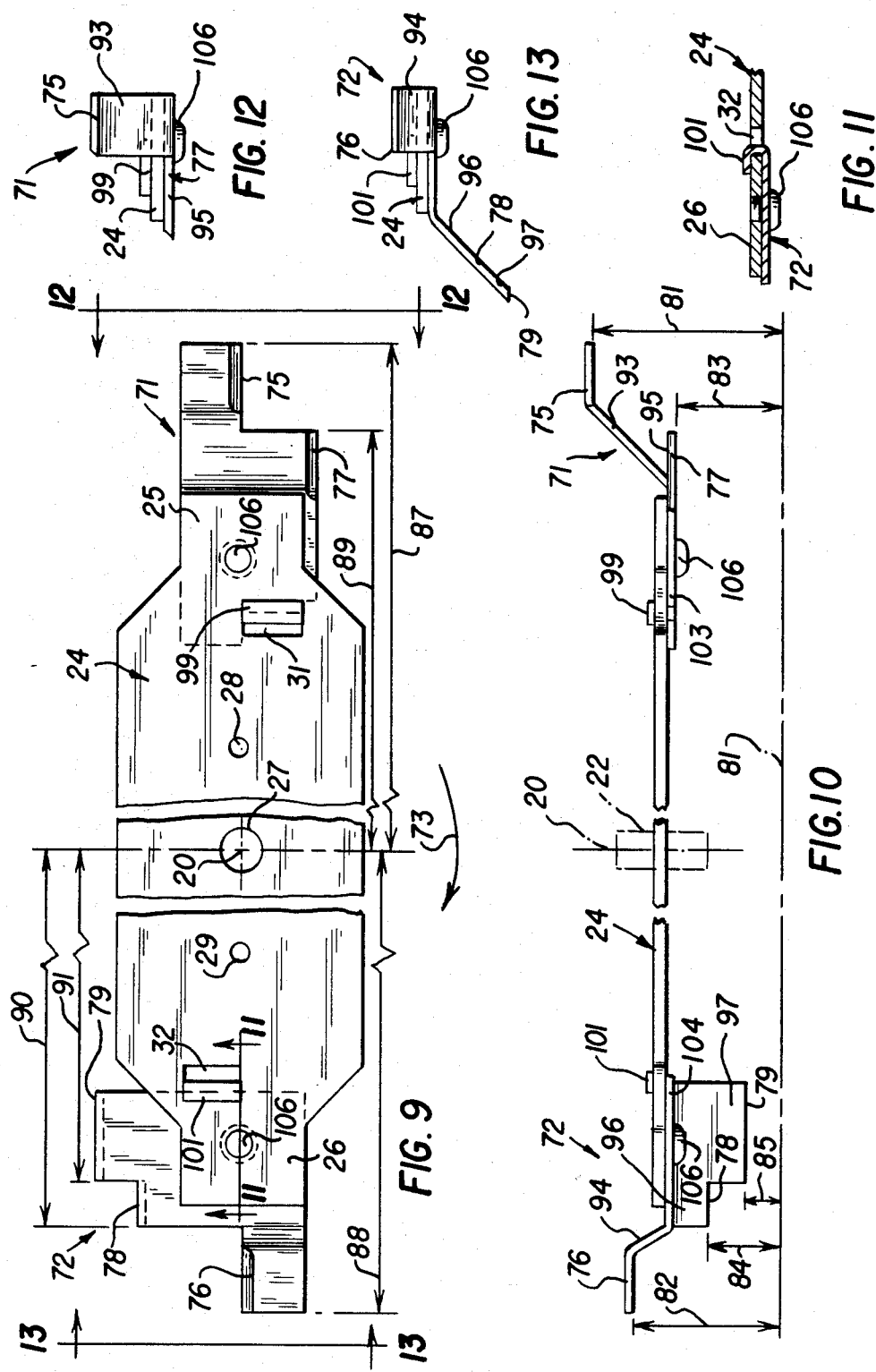

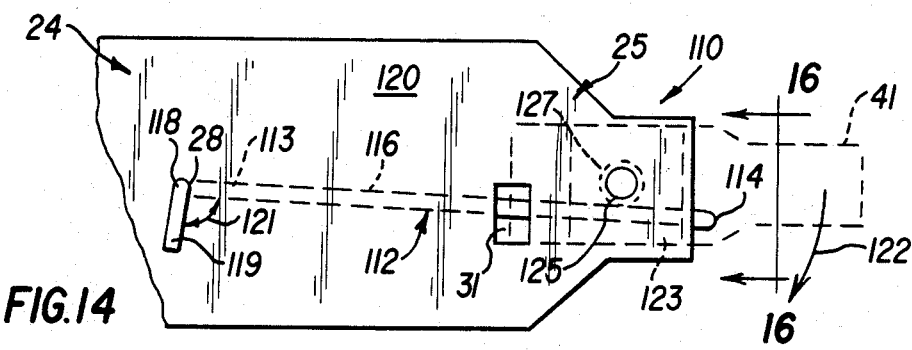
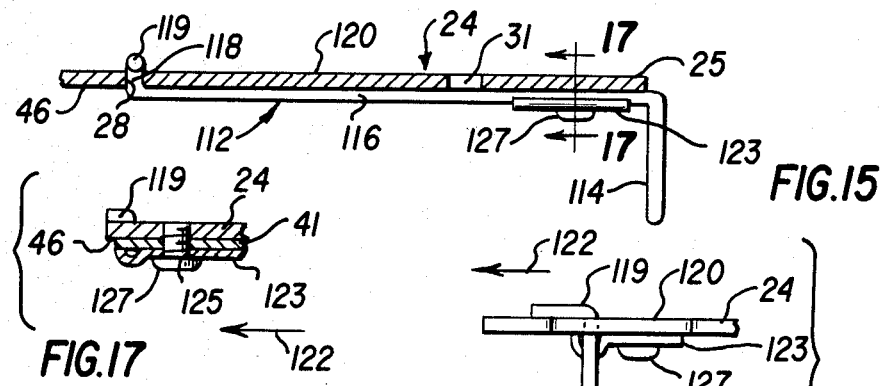
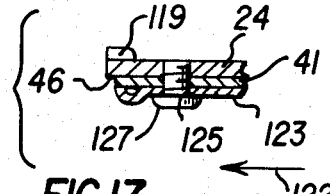
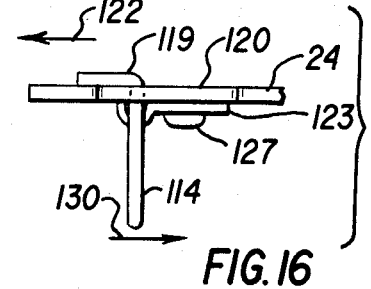
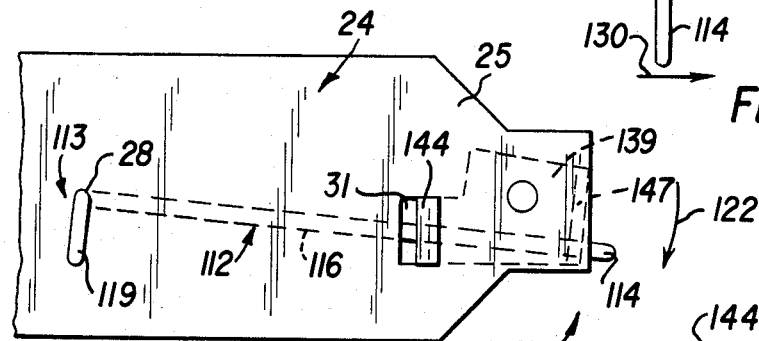
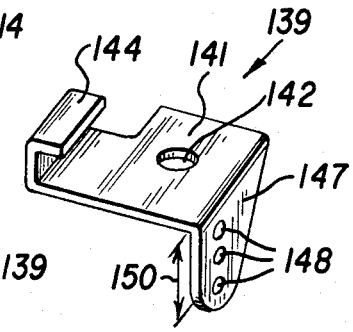
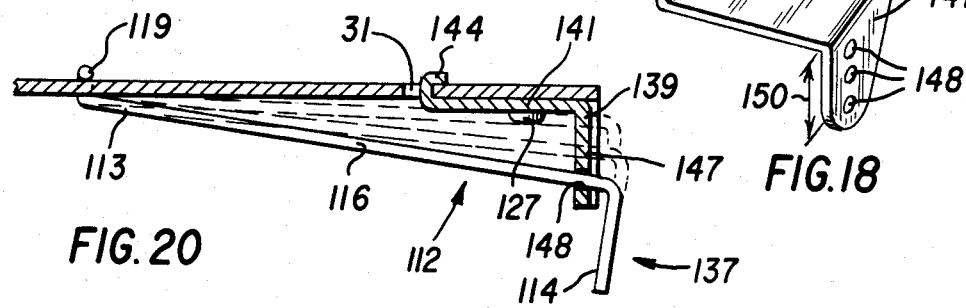

ROTARY LAWN MOWER ACCESSORIES

BACKGROUND OF THE INVENTION

1. Field of the Invention

The invention relates to accessories for use with a conventional rotary lawn mower, the accessories providing three distinct operations, namely grass cutting, grass mulching and power raking.

2. Prior Art

A conventional lawn mower has a bar provided with two oppositely disposed cutting edges which cut the grass as the bar is rotated and the mower is passed over the grass. When the cutting edges become blunt, the bar is removed from the mower, sometimes with great difficulty, and can then be sharpened to permit further use. During this sharpening it is not unusual for dissimilar amounts of metal to be removed from opposite ends of the bar, resulting in an unbalanced bar. This produces undesirable vibrations and can cause premature wear or damage to the lawn mower. Because the bar is secured to the end of the lawn mower output shaft with a heavy bolt, sometimes difficulty can be experienced in loosening this bolt to permit replacement or sharpening of the bar. Also, common bars are often flat and trailing portions of the cutting edges are within the same plane as the cutting edges, and thus drag on the recently cut grass. This increases resistance to rotation of the bar, thus absorbing unnecessary horsepower.

The problem of sharpening the conventional bars of lawn mowers has been appreciated, and disposable blades or cutting elements have been attached to ends of a modified bar, using various means. Examples of replaceable cutting elements for lawn mowers are found in U.S. Pat. Nos. 2,527,472 (Wolf); 2,576,884 (Leigh;) 2,786,322 (McEvers); 2,932,147 (Beeston Jr.); 3,140,575 (Ott et al) and 3,949,541 (Henry). Some of these blades have trailing portions which similarly drag on the grass, thus increasing power consumed. Some embodiments have relatively complex means for securing the blade to the end of the bar, and also require removal of the bar from the mower to permit replacement. This bar removal can of course be difficult due to the heavy bolt required to secure the bar to the output shaft of the mower. Other blades are relatively complex, and are designed to be sharpened many times in view of the relatively high cost of producing them, with a corresponding risk of uneven sharpening, resulting in unbalance of the bar. To simplify attaching the blade to the bar, some references show simple but non-positive attachments wherein a spring force, interference, or centrifugal force is required to hold the cutting element on the end of the bar. While this might be adequate while the cutting element is new, or if the lawn to be cut is very level and free of stones, but such types of non-positive attachment can be a problem if the cutting element becomes old and worn, or loosened, or if the mower hits a rock whilst cutting. In these instances, the element can be dislodged accidentally and thrown from the mower, with subsequent risk of injury to persons nearby.

If a lawn has exceptionally long grass, or if the cut grass is required to be left to "mulch" on the lawn, it is usual to set the mower to a relatively high cutting height, and to cut the lawn at that particular height. The lawn mower blade height can then be adjusted to a lower setting, and the mower can then once again pass over the lawn, cutting the grass sequentially and progressively lower with each adjustment. With this type of sequential cutting, in which the height of the cutting bar is progressively lowered relative to the lawn, the grass that had been previously cut is usually cut once again, concurrently with the grass remaining in the lawn. However, with exceptionally long grass the build up of cuttings on the lawn can overload the lawn mower, causing frequent stalling. Also, the grass cut in this manner usually is not cut very finely and is often unevenly dispersed on the lawn, producing unsightly winrows. Uneven dispersion of grass cuttings on the lawn does not produce the best type of mulching conditions, and commonly the lawn requires raking after such cutting. Specialized "mulching blades" are available which permit mulching of long grass in one pass and at one setting of the law mower, but these blades require removal for sharpening, with a subsequent risk of becoming unbalanced.

It is known to provide a bar for a lawn mower which has a rack attachment at each end. Such a bar is available to power rake the lawn, but the conventional cutter bar requires removal, and the power rake bar substituted. As stated previously, difficulty can be encountered when removing the heavy bolt that secures the bar to the output shaft. Also, such bars do not have an integral fine adjustment means for adjusting height of the power rake attachment, which is quite critical when raking well groomed lawns. Instead, the prior art raking bar relies on the height adjustment for the mower itself, which might be too coarse.

SUMMARY OF THE INVENTION

The invention reduces the difficulties and disadvantages of the prior art by providing a relatively simple, low cost accessory bar which is a substitute for the conventional cutter bar on a lawn mower, and can be left essentially permanently secured to the output shaft of the lawn mower, thus eliminating the need for frequent removal of the heavy securing bolt. The bar, as required, carries a variety of grass grooming accessories which are mounted at opposite the ends of the bar, and can be removed and replaced easily without special tools or removal of the bar. Three main accessories are envisaged, namely grass cutting elements for cutting grass, grass mulching elements for mulching the grass with one pass of the mower across the lawn, and power raking accessories for raking the lawn, either after cutting the lawn, or concurrently with cutting the lawn.

An accessory assembly according to the invention is for use with a rotary lawn mower, in which the lawn mower has a housing and a motor cooperating with the housing. The motor has a powered output shaft adapted to rotate about a generally vertical axis of rotation. The accessory assembly is characterized by an elongated accessory bar, and a pair of grass grooming means adapted to be mounted adjacent respective opposite ends of the bar. The accesory bar is adapted to be mounted on the output shaft to rotate therewith within the housing. The bar has opposite end portions, and each end portion has a location means and a positive fastener means. The location means is a location opening, and the fastener means and location opening of each end portion of the bar are spaced apart at a particular spacing and disposed along the bar so as to be located at different radii from the vertical axis. This is to provide lateral support for the grass grooming means to resist swivelling movement of the grass grooming means relative to the bar under operating forces. Each grass grooming means has a downwardly inclined outer portion adapted to cooperate with the grass, and an inner portion cooperating with the location means and with the fastener means. The inner portion having a first hook-shaped tang having an outwardly facing saddle means to engage the location opening. The tang also has a free end portion extending from the saddle means and away from the axis of rotation of the bar. Each grass grooming means also had positive fastener means spaced from the tang at the said particular spacing and cooperating with the positive fastener means of the bar to secure the grooming means positively to the accessory bar. The fastener opening is positioned outwardly of the location opening with respect to the axis of rotation.

One embodiment of the grass grooming means is a cutting element for cutting grass which is characterized by the inner portion of the cutting element having a tang to engage the location opening of the bar so as to resist centrifugal and cutting forces. The cutting element also has a fastener opening adapted to receive a positive fastener which cooperates with the fastener opening of the bar.

A second embodiment of the grass grooming means includes a mulching means adapted to cut grass finely for mulching purposes. The mulching means has a plurality of cutting edges which are spaced at different heights above the grass when the mower is cutting, so as to provide a series of incremental cuts which cut the grass sequentially and progressively downwardly towards the grass roots, as the mower passes over the grass. Preferably, the cutting edges of the mulching means are spaced at different radii from the axis of rotation so that a cutting edge which is spaced highest above the grass is furthest from the axis of rotation, and thus tends to cut a particular area of the grass first, as the mower passes over the lawn. Correspondingly a cutting edge spaced closest to the grass is closest to the axis of rotation and tends to cut the said particular area of the grass last, as the mower passes over the grass.

A third embodiment of the grass grooming means is a power raking means characterized by an elongated resilient rake element having an inner portion which cooperates with the location means and fastener means, and an outer portion which is inclined downwardly to de-thatch the grass as the mower passes over the grass. Preferably, the inner portion of the resilient rake element has a fixed inner end and an essentially straight intermediate portion extending outwardly therefrom towards the outer portion of the rake element. The straight intermediate portion is adapted to permit torsional twisting along the length thereof in response to raking forces acting on the outer portion thereof.

A detailed disclosure following, related to drawings, describes several embodiments of the invention, which is capable of expression in structure other than that particularly described and illustrated.

DESCRIPTION OF THE DRAWINGS

FIG. 1 is a simplified fragmented longitudinal section of a lower portion of a lawn mower fitted with an accessory bar according to the invention, without grass grooming means attached thereto, FIG. 2 is a simplified top plane view of the accessory bar according to the invention, shown removed from the mower, and without grass grooming means attached thereto, FIG. 3 is a perspective of a grass cutting element according the the invention, FIG. 4 is a simplified fragmented top plan of one end of accessory bar of FIG. 2, with the grass cutting element attached thereto, FIG. 9 is a simplified, fragmented top plan view of the first and second mulching elements shown attached to the accessory bar of FIG. 2, FIG. 10 is a simplified, fragmented front view of the accessory bar and grass mulching elements of FIG. 9, FIG. 11 is a simplified framented section on line 11—11 of FIG. 9, showing location means and fastener means, FIG. 12 is a simplified end view of the first mulching means, as seen from line 12—12 of FIG. 9, FIG. 13 is a simplified end view of the second grass mulching means, as seen from line 13—13 of FIG. 9, FIG. 14 is a simplified fragmented top plan view of a first embodiment of a power raking means shown attached to one end of the accessory bar of FIG. 2, FIG. 15 is a simplified fragmented front elevation partially in section, of the power raking attachment of FIG. 14, FIG. 16 is a simplified fragmented end view of a power raking attachment, as will be seen from line 16—16 of FIG. 14, FIG. 17 is a simplified fragmented section, generally on line 17—17 of FIG. 15, but showing the simultaneous attachment of the cutting element of FIG. 3 with the power raking element of FIG. 14, FIG. 18 is a simplified perspective of a second embodiment of a location bracket which permits relatively fine adjustment of the height of the power raking means, FIG. 19 is a simplified framented bottom plan view of the second embodiment of the bracket cooperating with a power raking element, FIG. 20 is a simplified fragmented front elevation of second embodiment of the power raking means of FIG. 18, with the power rake element shown in three possible positions of a varying heights,

DETAILED DISCLOSURE

FIGS. 1 and 2

Figure 5:
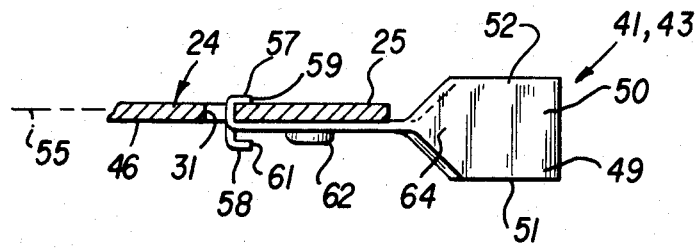
FIG. 5 is a simplified front view and partial section, as would be seen generally on line 5—5 of FIG. 4.

A rotary lawn mower 10 has a housing 11, and a motor 12 cooperating with the housing. The housing is supported on two pairs of wheels 14, and a handle 16 extends upwardly for gripping by an operator. The motor has a powered output shaft 18 adapted to rotate about a generally vertical axis of rotation 20, and in conventional lawn mowers a cutter bar, not shown, is secured by a heavy bolt 22 to the lower end of the output shaft.

In the present invention, the cutter bar is removed and an accessory bar 24 according to the invention is substituted. The bar 24 is similarly secured to the outer end of the shaft 18 with the bolt 22, but usually, once secured with the bolt, the bar does not require removal unless major maintenance is required. Thus the accessory bar is adapted to be mounted essentially permanently on the output shaft to rotate therewith within the housing. The bar has opposite end portions 25 and 26, each end portion having a location means and a positive fastener means as will be described. A pair of grass grooming means, not shown, are adapted to be mounted adjacent respective opposite end portions of the bar and are described in greater detail with reference to subsequent figures. As will be seen, each grass grooming means has a downwardly inclined outer portion adapted to cooperate with the grass, and an inner portion cooperating with the location means and with the fastener means.

Referring to FIG. 2, the accessory bar 24 has a central opening 27 to receive the bolt 22, and equally spaced first and second inner opening 28 and 29 positioned between the opening 27 and the respective first and second end portions 25 and 26. The first and second end portions 25 and 26 are similar to each other and have first and second location openings 31 and 32, and first and second fastener openings 33 and 34 respectively, serving as location and fastener means. The openings 31 and 32 are spaced equally from the opening 27, as are the openings 33 and 35.

At each end portion of the bar, the fastener opening is positioned outwardly of the adjacent location opening with respect to the axis of rotation. Thus, the fastener means and location means at each end are spaced along the bar at different radii from the vertical axis to provide lateral support for the grass grooming means to resist swivelling movement of the grooming means relative to the bar and operating forces. As will be described, the inner openings 28 and 29 serve as location means for the power rake attachment in combination with other means. As can been seen, the location openings 31 and 32 are generally rectangular in shape and are displaced slightly to one side of a central axis 36 of the elongated bar 24. The first and second fastener openings 33 and 34 are circular, and disposed on the axis 36 and can have either internal threads to receive attachment screws, not shown, or can be fitted with a weld nut to increase security. Alternatively, a short threaded stud could be secured to extend downwardly from the bar to receive a nut as an alternative fastening means, but this is not preferred as exposed threads of the stud can be damaged.

FIGS. 3 through 6

A first embodiment of the grass grooming means according to the invention is a grass cutting element 41 for cutting grass as in a conventional lawn mower. The element 41 is formed from a simple sheet metal blank, and can be produced at a relatively low cost so as to be essentially disposable, that is it is not designed for resharpening, but can be if desired provided care is taken to maintain balance. Two identical cutting elements are used together, one being secured at each end of the bar. Direction of rotation is shown as arrows 42.

The grass cutting element 41 has outer and inner portions 43 and 44, and is fitted adjacent a lower surface 46 of the bar as best seen in FIG. 5. The element is reversible relative to the bar, that is, it can be fitted in one of two positions, and effectively doubles the life of the cutting elements as this enables two cutting edges to be provided on one element. The outer portion of the element has oppositely disposed first and second cutting portions 49 and 50, provided with first and second cutting edges 51 and 52 respectively. The cutting portions 49 and 50 extend downwardly and upwardly respectively from the bar so as to be spaced below and above a plane of the bar 55 when the mower is positioned above the grass. This provides an active and an inactive cutting edge, namely edge 51 and 52 as shown respectively, which are dependent on the relative positions of the cutting element and the bar. Clearly, if the element 41 were reversed, the second cutting edge 52 would become the active edge, and the first cutting edge 51 would become the inactive edge. As seen in FIG. 4, the cutting edges 51 and 52 are parallel to each other when viewed along the axis of rotation 20 of the bar.

The inner portion of the cutting element has first and second tangs 57 and 58 which extend upwardly and downwardly, i.e. the tangs extend in opposite directions away from a longitudinal plane of the cutting elements or the bar as best seen in FIG. 5. The tangs are essentially U-shaped i.e., hook-shaped and have saddles which face outwardly and are adapted to engage outer edges of the location opening 31 when a particular cutting edge is active. The tangs 57 and 58 have free end portions 59 and 61 extending from the saddle means and away from the axis of rotation 20 of the bar and generally towards an adjacent end portion of the bar. In this particular case, while the first cutting edge 51 is active, the first tang 57 engages the outer portion of the opening 31, and the second tang 58 extends downwardly, freely of the bar. Thus the tang engages the location opening of the bar so as to resist centrifugal and cutting forces when the mower is operating. The inner portion of the cutting element also has a fastener opening 60, see FIG. 3, which is adapted to receive a short bolt or fastener 62, shown only in FIG. 5, which cooperates with the fastener opening of the bar and secures the cutting element 41 positively to the end of the bar. Radial spacing between the tang and bolt resist the swivelling forces imposed on the element 41 relative to the bar, shown as arrow 61.

Figure 6:
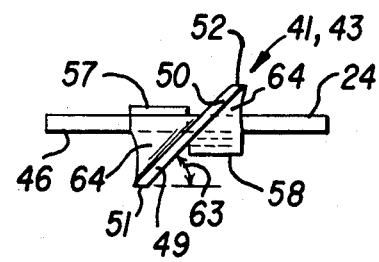
FIG. 6 is a simplified end view as would be seen from line 6—6 of FIG. 4.

As can be seen, the inner portion of the cutting element is generally flat and lies against the lower surface 46 of the bar, and the outer portion of the cutting element is also generally flat but inclined at an angle 63, see FIG. 6 to the inner portion to provide relative disposition of the first and second cutting portions as shown. The cutting element has an intermediate warped portion 64, best seen in FIG. 3, which smoothly interconnects the outer and inner portions of the cutting element. Clearly there is considerably less drag on the grass from the inclined outer portion than with the flat cutting bars of the prior art.

FIGS. 7 through 13

A second embodiment of the grass grooming means is a mulching means adapted to cut grass finely for mulching purposes. The mulching means includes two distinct and dissimilar mulching elements, designated first and second elements 71 and 72, which are adapted to be used together adjacent opposite first and second end portions 25 and 26 of the bar. Because the end portions 25 and 26 are similar, either mulching element can be fitted at either end of the bar. Each mulching element is positioned at a selected radius from the axis of rotation 20 so as to be balanced with respect to the other mulching element, so as to eliminate essentially possible balancing problems. The first and second mulching elements are a matched pair, in which each mulching element has cutting edges which are spaced at particular heights above the grass that are different from each other as will be described. Direction of rotation is shown as arrows 73.

Referring to FIG. 10, the pair of mulching elements together provide a total of five cutting edges disposed at different heights from the grass, the edges being designated 75, 76, 77, 78 and 79 representing first, second, third, fourth and fifth cutting edges respectively. The cutting edge which is highest or spaced furthest above the grass is designated the first cutting edge 75, and the cutting edge which is lowest or spaced closest to the grass is designated the fifth cutting edge 79, with the intermediate edges being positioned in sequence. The first mulching cutting element 71 has the first and third cutting edges 75 and 77 respectively, and the second mulching element 72 has the second, fourth, and fifth cutting edges 76, 78 and 79 respectively. If the roots of the grass are considered to be at a ground datum 81, it can be seen that the height of grass cut by each blade is as follows. The first and third blades 75 and 77 cut grass at first and third heights 81 and 83 respectively above the datum 81, and the second, fourth and fifth cutting edges 76, 78 and 79 cut grass at second, fourth and fifth heights 82, 84 and 85 respectively above the datum 81.

As best seen in FIG. 9, each particular cutting edge is positioned at a particular spacing from the axis 20 of rotation. For convenience, because the cutting edges are generally radial and thus have a range of spacing, the maximum spacing or radius of the cutting edge from the axis 20 is considered to be the operating radius, because it is the extreme outer portion of a particular cutting edge that first contacts grass as the mower is advanced across the lawn. When considering the first mulching element 71, the first and third edges are positioned at first and third radii 87 and 89 respectively from the axis 20. Similarly, when considering the second mulching element 72, the second, fourth and fifth cutting edges 76, 78 and 79 are positioned at second, fourth and fifth radii 88, 90 and 91 respectively. The first radius 87 is the greatest radius, and the fifth radius 91 is the shortest, with the intermediate radii positioned proportionally between the first and fifth. This relative spacing of radii is important as the relative radii between the cutting edges determines which cutting edge contacts a particular portion of grass in sequence. As can be seen, from the above description, the cutting edge spaced highest above the grass, namely the first edge 75, is also spaced furthest from the axis of rotation and tends to cut a particular area of grass first, as the mower passes over the grass. Similarly, the cutting edge spaced closest to the grass, namely the fifth edge 79, is also closest to the axis of rotation and tends to cut the said particular area of grass last, as the mower passes over the grass. The second, third and fourth cutting edges are similarly spaced progressively inwardly towards the axis 20, so as to provide relatively smooth increments of spacing between the cutting edge relative to the axis 20.

It can be seen that as the mower advances across the lawn, the mulching means provides a plurality of cutting edges which are spaced at different heights above the grass when the mower is cutting, so as to provide a series of incremental cuts which cut the grass sequentially and progressively downwardly towards the grass roots, as the mower passes over the grass. In an ideal or theoretical situation, as the mower is advanced across the grass, a sufficiently tall piece of grass would first be cut by the first cutting edge 75 of the first element, and then by the second cutting edge 76 of the second element, and then by the third cutting edge of the first element, and then by the fourth and fifth cutting edges respectively of the second element. In the theoretical situation, that particular piece of grass would have been cut into five separate pieces, with a relatively close control of the length of each piece of grass cut after the first cut of the first cutting edge. Clearly, if it is an exceptionally long length of grass, there could be a relatively long length of grass cut by the first cutting edge, but the remaining pieces of grass would have lengths determined by the difference in heights of sequential cutting edges. The spacing between the adjacent or sequential cuts can be in the order of 1 cm or slightly less, depending on the degree of fineness of the grass to be mulched.

Figure 7:
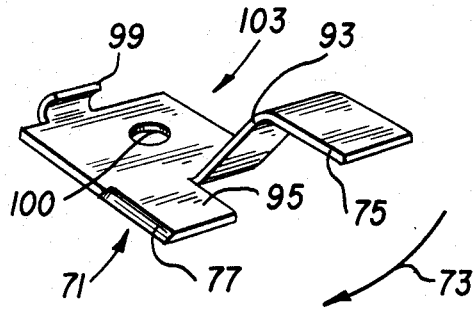
FIG. 7 is a perspective of a first mulching element according to the invention.
Figure 8:
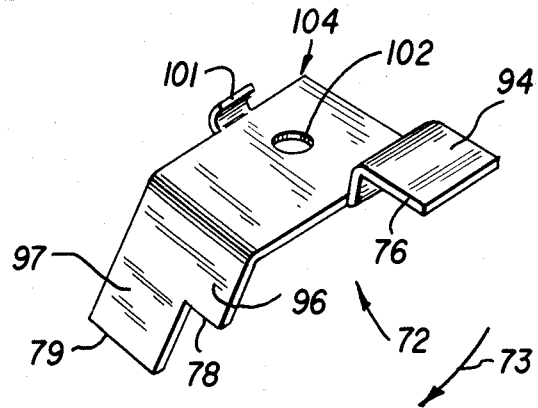
FIG. 8 is a perspective of a second mulching element according to the invention.

As seen best in FIGS. 7 and 12, the first mulching element 71 has an outer portion having first and third cutting portions 93 and 95 which have the first and third cutting edge 75 and 77 at respective ends thereof. Similarly, as best seen in FIGS. 8 and 13, the second mulching element 72 has second, fourth and fifth cutting portions 94, 96 and 97 which have the respective second, fourth and fifth cutting edges at outer ends thereof. The first element has a location means or tang 99, and a fastener opening 100, and the second element has a location means or tang 111, and a fastener opening 102. The fastener opening of each element receives the positive fastener or bolt 106 to cooperate with the fastener openings 31 and 32 respectively of the bar. The tangs 99 and 101 of the elements 71 and 72 cooperate with the location openings 31 and 32 of the bar in the same manner as the tangs 57 or 58 of the cutting element 41 of FIG. 3. Clearly inner portions 103 and 104 of the mulching elements 71 and 72 are equivalent to the inner portion 44 of the element 41. Because the mulching means are required to be secured in a particular position relative to the bar, that is the mulching means are not reversible at a particular end, a second tang as shown in the grass cutting element 41 of FIGS. 3–6 is not required. Clearly, the pair of mulching elements can be interchanged and fitted at either end of the bar, but two distinct mulching means should be used together as a matched and balanced pair in which the relative weights and relative spacing are balanced.

In summary, the inner portion of each mulching element has a tang to engage the respective location opening of the bar so as to resist centrifugal and cutting forces, and a fastener opening which cooperates with the respective fastener. The outer portion of each mulching element has at least two cutting portions provided with respective cutting edges spaced vertically and radially apart from each other.

FIGS. 14 through 17

A third embodiment of the grass grooming means is a power raking means 110 which has an elongated resilient rake element 112 having inner and outer portions 113 and 114 respectively. The inner portion 113 cooperates with the first inner opening 28 at the bar, as will be described, and the outer portion 114 is inclined downwardly to de-thatch the grass as the mower passes over the grass. Two identical raking means are used together, one being fitted at each end of the bar.

The rake assembly has an essentially straight intermediate portion 116 lying beneath the bar 24 and extending outwardly from the inner portion towards the outer portion. The outer portion extends downwardly generally at right angles to the intermediate portion. The inner portion 113 has a relatively short anchor portion 118 which has a length somewhat greater than thickness of the bar 24 to enable it to pass through opening 28.

The inner portion has an extreme inner end portion 119 which extends from the anchor portion 118 at an angle 121, FIG. 14, to the intermediate portion 116 and engages an upper surface 120 of the bar the angle 121 being approximately 90°. The portion 119 extends from the intermediate portion 116, when viewed along the axis 20, in the same direction of rotation as the bar 24, shown as an arrow 122. As will be described, the extreme inner end portion 119 engages the upper surface 120 of the bar and is designed to resist torsional twisting occurring during operation.

A journalling means or bracket 123 is an essentially square metal sheet having an opening 125 to receive a bolt or positive fastener 127. The bracket 123 has an engagement portion 129 which is U-sectioned so as to be generally complementary to a portion of the rake element and engages the rake element to resist swivelling due to raking forces. The engagement portion partially encircles the intermediate portion 116 of the rake element to provide a bearing with sufficient clearance to permit limited rotation of the rake element to permit torsional twisting of the intermediate portion in response to raking forces. As best seen in FIG. 16, as the bar 24 rotates in direction of the arrow 122, drag force shown as arrow 130 acts in the opposite direction to rotation, thus applying a twisting force to the intermediate portion 116. This twisting force is resisted by the extreme inner end portion 119, which bears against the upper surface 120 of the bar.

In this embodiment it can be seen that the location opening 31 of the bar is not required to locate the engagement bracket 129. Instead, the inner opening 28 is used as a location opening for the inner portion 113 of the rake element and functions in a manner generally similar to the location opening 31 to resist centrifugal and swivelling forces. Clearly, the fastener opening 33 containing the fastener 127 which cooperates with the engagement bracket 129 functions in a similar manner to positively locate the raking element to the end of the bar.

The description above assumes that the grass is sufficiently short to permit power raking. In order to save time, if sufficient power is available it is possible to cut the grass and power rake it simultaneously using two elements attached to each end of the bar. This is shown in broken line in FIG. 14 and in full line in FIG. 17 where the grass cutting element 41 of FIGS. 3 through 6 is shown sandwiched between the journalling bracket 123 and the lower surface 46 of the bar 24. Clearly the outer portion 114 of the rake element is positioned to avoid interference with the element 41 when twisting under raking forces. The element 41 is to be fitted and located with the same fastener means as that used for the bracket 123. The above arrangement may not be fully operable for certain grass conditions, or where a high quality grass grooming operation is required.

FIGS. 18 through 20

A second alternative power raking means 137 uses the similar rake element 112, and an alternative journalling bracket 139 is substituted for the journalling bracket 123 of FIG. 14. As best seen in FIG. 18, the journalling bracket 139 has a main portion 141 having a fastener opening 142 to receive a positive fastener or bolt, not shown in FIG. 18, and an upwardly extending tang 144 to engage the location opening 31 of the accessory bar. Note that the opening 31 is a second location opening engaged by the power raking means, the first inner opening 28 being also engaged by the inner portion 113 of the rake element as described with reference to FIGS. 14–17. Clearly, the tang 144 cooperates with the location opening 31 similarly to previously described tangs, and together with the positive fastener means resists centrifugal and raking forces imposed on the engagement means during operation. The alternative journalling bracket 139 also has a flange 147 extending downwardly from the main portion 141, the flange having a plurality of openings 148 which are complementary to the rake element and serve as engagement portions equivalent to the portion 129 of FIGS. 14–17. The openings are spaced at different distances, one distance 150 being shown, from the main portion to provide a variety of different spacing for the rake element from the bar.

As best seen in FIG. 20, the intermediate portion 116 of the rake element can be passed through one of the three openings 148, so as to vary the location of the extreme lower end of the outer portion 114. The rake element is shown in broken outline inserted into the two remaining openings in the flange 147 to illustrate a corresponding change in the location of the lower extreme outer end of the rake element.

By providing a choice of openings for the rake element, the choice of height setting for the rake element for a particular job is increased. While some rotary lawn mowers provide very fine adjustment means for each wheel of the mower, others have relatively coarse adjustment means, which does not always provide sufficient fine adjustment for power raking. Clearly, close spacing between the openings in the flange 147 increases the choice of height settings.

With both power rake embodiments, replacement of a broken rake element is simple and does not incur much expense.

OPERATION

The operation of the accessory according to the invention is very simple and follows common lawn grooming procedures. Clealy, the mower is inverted to facilitate changing of the elements, and it is again stressed that the securing bolt 22 does not require removal to change elements. To change any accessory, the only tool required is means to rotate the positive fastener or bolt, screw, etc., such as a wrench or screw driver. The elements are fitted easily to the underside of the accessory bar by inserting the tang or raking element end into the requisite opening, and then securing the bolt or screw. Thus there is no requirement for an operator to have to put his hand in the relatively small space between the housing and the bar itself. Particular care should be taken in ensuring that matched pairs of mulching elements are used, so as to eliminate unbalanced problems. Also, for both the remaining grass cutting elements, and the power raking means, it is essential that matched pairs are used, so that weights are equal at opposite ends of the accessory bar.

I claim:

1. An accessory assembly for use with a rotary lawn mower having a powered output shaft adapted to rotate about a generally vertical axis of rotation, the accessory assembly including:
   (a) an elongated accessory bar adapted to be mounted on the output shaft to rotate therewith, the bar having opposite end portions, each end portion having a location opening and a positive fastener means, the fastener means and location opening of each end portion of the bar being spaced apart at a particular spacing and disposed along the bar so as to be located at different radii from the vertical axis, (b) a pair of grass cutting elements mounted adjacent respective outer end portions of the bar, each grass cutting element having a downwardly inclined outer portion adapted to cooperate with the grass, and an inner portion having a first hook-shaped tang having an outwardly facing saddle means to engage the location opening, the tang also having a free end portion extending from the saddle means and away from the axis of rotation of the bar, each grass cutting element also having a positive fastener means spaced from the tang at the said particular spacing and cooperating with the positive fastener means of the bar to secure the cutting element positively to the accessory bar, and to provide lateral support for the cutting element to resist swivelling movement of the cutting element relative to the bar under operating forces, (c) the outer portion of each grass cutting element also having oppositely disposed first and second cutting portions provided with first and second cutting edges which extend downwardly and upwardly respectively from the bar so as to be spaced below and above a plane of the bar when the mower is positioned above the grass, so as to provide an active and an inactive cutting edge respectively dependent on the relative positions of the cutting element and the bar, (d) the inner portion of each grass cutting element also having a second tang which is generally similar to the first tang, the tangs extending in opposite directions from a longitudinal plane of the inner portion, one particular tang engaging the location opening when the cutting edge associated with that tang is active.

2. An accessory assembly as claimed in claim 1 further characterized by:
(a) the cutting edges being parallel to each other when viewed along the axis of rotation of the bar.

3. An accessory assembly as claimed in claim 2 further characterized by:
(a) the inner portion of the cutting element being generally flat and lying against the bar, and the outer portion of the cutting element being generally flat but inclined at an angle to the inner portion to provide the first and second cutting portions, the cutting element having an intermediate warped portion smoothly interconnecting the outer and inner portions thereof.

4. An accessory assembly for use with a rotary lawn mower having a powered output shaft adapted to rotate about a generally vertical axis of rotation, the accessory assembly including:
(a) an elongated accessory bar adapted to be mounted on the output shaft to rotate therewith, the bar having opposite and portions, each end portion having a location opening and a positive fastener means, the fastener means and location opening of each end portion of the bar being spaced apart at a particular spacing and disposed along the bar so as to be located at different radii from the vertical axis,
(b) a pair of grass power raking means mounted adjacent respective outer end portions of the bar, each raking means having a downwardly inclined outer portion adapted to sweep the grass, and an inner portion having a first hook-shaped tang having an outwardly facing saddle means to engage the location opening, the tang also having a free end portion extending from the saddle means and away from the axis of rotation of the bar,
(c) each raking means also having a positive fastener means spaced from the tang at the said particular spacing and cooperating with the positive fastener means of the bar to secure the raking means positively to the accessory bar and to provide lateral support for the raking means to resist swivelling movement of the raking means relative to the bar under operating forces,
(d) each raking means also including an elongated resilient rake element having a fixed inner end received in an opening in the accessory bar, and an essentially straight intermediate portion extending outwardly from the inner end towards an outer portion of the respective rake element adapted to sweep the grass,
(e) each raking means also including a journalling means secured to the bar and having an engagement portion adjacent the outer portion of the rake element to engage the intermediate portion of the rake element so as to resist swivelling of the rake element relative to the bar due to raking forces, and to permit limited rotation of the intermediate portion of the rake element therein to permit torsional twisting of the rake element in response to raking forces.

5. An accessory assembly as claimed in claim 4 in which:
(a) the positive fastener means of the bar includes a fastener opening which is spaced along the bar so that the fastener opening is spaced outwardly of the location opening,
(b) the essentially straight intermediate portion of the rake element being disposed to lie beneath the bar between the location and fastener openings with the inner portion thereof passing through the location opening of the bar to resist centrifugal forces,
(c) the outer portion of the rake element extending downwardly generally at right angles to the straight intermediate portion.

6. An accessory assembly as claimed in claim 5 further characterized by:
(a) the inner portion of the rake element having an anchor portion having a length somewhat greater than thickness of the bar so as to pass through the location opening,
(b) the inner porton also has an extreme inner end portion which extends from and is inclined to the anchor portion to engage an upper surface of the bar to resist torsional twisting.

7. An accessory assembly as claimed in claim 6 further characterized by:
(a) the journalling means has a main portion having a fastener opening to receive the positive fastener, and an upwardly extending tang to engage another location opening of the accessory bar,
(b) the engagement means of the journalling means having a flange extending downwardly therefrom, the flange having a plurality of openings complementary to the rake element and spaced at different distances from the main portion, to serve as the engagement portion to provide a variety of different spacings of the rake element from the bar.

8. A grass cutting accessory for attachment to a rotatable accessory bar of a rotary lawnmower, the grass cutting accessory including:
  (a) an inner portion having a first hook-shaped tang extending outwardly from a longitudinal plane of the inner portion and having an outwardly facing saddle means to engage the bar so as to resist centrifugal and cutting forces, the tang also having a free end portion extending from the saddle means and away from an axis of rotation of the bar, the accessory also having a fastener opening to receive a positive fastener for securing the element to the bar,
  (b) an outer portion having oppositely disposed first and second cutting portions provided with first and second cutting edges which extend downwardly and upwardly respectively from the longitudinal plane of the inner portion so as to be spaced below and above the plane of the inner portion when the mower is positioned above the grass, so as to provide an active cutting edge and an inactive cutting edge respectively, dependent on the relative positions of the cutting accessory and the bar,
  (c) the inner portion of the accessory having a second tang which is generally similar to the first tang, the tangs extending in opposite directions from the longitudinal plane of the inner portion, so that one particular tang engages the bar when the cutting edge associated with that tang is active.

* * * * *